United States Patent [19]

Kuse

[11] Patent Number: 4,743,412
[45] Date of Patent: May 10, 1988

[54] SPACE PORTION PROCESSING METHOD AND APPARATUS FOR A SLIDE FASTENER CHAIN

[75] Inventor: Kazuki Kuse, Toyama, Japan

[73] Assignee: Yoshida Kogyo K.K., Tokyo, Japan

[21] Appl. No.: 11,358

[22] Filed: Feb. 2, 1987

Related U.S. Application Data

[63] Continuation-in-part of Ser. No. 763,417, Aug. 7, 1985, abandoned.

[30] Foreign Application Priority Data

Aug. 21, 1984 [JP] Japan .................. 59-173784

[51] Int. Cl.⁴ .................. B29C 65/08; B29D 5/00
[52] U.S. Cl. .................. 264/23; 29/33.2; 29/408; 29/766; 156/64; 156/73.1; 156/73.2; 156/73.4; 156/304.1; 156/308.4; 156/361; 156/379.8; 156/380.8; 156/502; 156/580.1; 156/580.2; 264/40.2; 264/40.7; 264/248; 264/252; 264/320; 264/DIG. 66; 425/145; 425/174.2; 425/500; 425/814
[58] Field of Search .................. 264/23, 40.2, 40.7, 264/248, 249, 252, 320, DIG. 66; 425/145, 174.2, 500, 814, DIG. 34; 156/64, 66, 73.1, 73.2, 73.4, 304.1, 308.4, 361, 379.8, 380.8, 502, 580.1, 580.2; 29/33.2; 408, 766, 767, 768

[56] References Cited

U.S. PATENT DOCUMENTS

| | | | |
|---|---|---|---|
| 2,957,204 | 10/1960 | Gobeil et al. | 264/DIG. 66 |
| 3,514,511 | 5/1970 | Waldes | 264/248 |
| 3,867,232 | 2/1975 | Thompson et al. | 156/502 |
| 3,999,255 | 12/1976 | Warburton et al. | 264/23 X |
| 4,110,891 | 9/1978 | Akashi | 29/408 |
| 4,170,617 | 10/1979 | Akashi | 264/23 |
| 4,190,945 | 3/1980 | Yoshida et al. | 29/408 |
| 4,250,781 | 2/1981 | Nakamura | 83/210 |
| 4,457,062 | 7/1984 | Osaki | 29/408 |
| 4,462,154 | 7/1984 | Morita | 29/767 |
| 4,490,199 | 12/1984 | Dunning | 156/73.4 |
| 4,505,659 | 3/1985 | Chijiishi et al. | 425/814 |
| 4,615,668 | 10/1986 | Matsuda | 425/145 |

FOREIGN PATENT DOCUMENTS

| | | | |
|---|---|---|---|
| 89002 | 9/1983 | European Pat. Off. | |
| 2916340 | 10/1979 | Fed. Rep. of Germany | |
| 57-9928 | 2/1982 | Japan | 156/502 |
| 1572840 | 8/1980 | United Kingdom | |
| 2097321 | 11/1982 | United Kingdom | 264/40.2 |
| 2132691 | 7/1984 | United Kingdom | |

*Primary Examiner*—Jeffery Thurlow
*Assistant Examiner*—Leo B. Tentoni

[57] ABSTRACT

A space portion processing method and apparatus for preprocessing a slide fastener chain before attaching parts forming a separable end stop such as a retainer pin and a separable pin at the space portion of a slide fastener chain formed by cutting and removing a row of elements for a certain length from a row of coil-like continuous fastener elements of thermoplastic resin attached around a core cord along each of the facing side edges of a pair of fastener tapes are disclosed. After the space portion is detected and positioned and the slide fastener chain is held on a bed, fusion of the element cut edges at the end of the space portion into the tapes and press-forming of the core cords is carried out simultaneously by using the same pressing means. The space portion processing method and apparatus for a slide fastener chain according to the invention enables the apparatus to be made simple and compact, allows processing efficiency to be improved, and processing costs to be lowered.

9 Claims, 8 Drawing Sheets

SPACE PORTION PROCESSING METHOD AND APPARATUS FOR A SLIDE FASTENER CHAIN

This is a continuation-in-part, of application Ser. No. 763,417, filed Aug. 7, 1985, now abandoned.

BACKGROUND OF THE INVENTION

The present invention relates to a space portion processing method and apparatus for a slide fastener chain, and more specifically to a space portion processing method and apparatus for processing a slide fastener chain before attaching parts forming a separable end stop such as a retainer pin and a separable pin at the space portion of a slide fastener chain formed by cutting and removing a row of elements for a certain length from a row of coil-like continuous fastener elements of thermoplastic resin attached around a core cord along each of the facing side edges of a pair of fastener tapes.

DESCRIPTION OF THE PRIOR ART

In a slide fastener chain wherein each of the rows of continuous fastener elements of thermoplastic resin formed in coil or zig-zag fashion is sewn on each of the facing side edges of a pair of fastener tapes together with a core cord, the attachment of parts forming a separable end stop which consists of attaching a retainer pin, a fixed retainer and a separable pin to stringers of said slide fastener is carried out in the following steps:

(Reference should be made to FIG. 1.)

(1) Rows of elements are cut and removed from the chain 1 for a certain length to form a space portion "S".

(2) A preprocessing is performed in which cut edges 5,5 of the elements on each stringer 3,3 are fused into tapes 7,7 and core cords 9,9 and sewing threads 11,11 are press-formed to eliminate the looseness and deformation thereof brought about during the space formation process.

(3) A retainer pin 13 and fixed retainer 15, which are formed as one integral unit, and a separable pin 17 are fitted on the core cords and sewing threads at the space portion.

Incidentally, the necessity for the core cords 9 and the press-forming process thereof is as follows. Namely, in this type of slide fastener chain 1, each of the core cords 9 is firstly inserted into the respective rows of coil-like continuous fastener elements so as to prevent the fastener elements from being squashed. These elements and core cords are only fixed to one face of the fastener tape 7 by means of threads 11. When rows of elements are thereafter cut and removed from the chain 1 over a certain length such as to form a space portion "S" as mentioned above, the tension of the threads corresponding to the space portion "S" decreases and, therefore, the core cord 9 corresponding to the portion "S" naturally swells or deforms. Accordingly, it is necessary to press-form the core cords 9 so as to give them a predetermined height and width in order to allow the retainer pin 13, fixed retainer 15 and separable pin 17 to be firmly fixed thereto.

In the past practice, the fusion of cut element edges into the tapes at the space portion and the press-forming of the core cord and the sewing threads have been carried out in different processes using different pressing means. This has involved disadvantages in that the processing apparatus has needed to be complex and large in size, processing efficiency has been low and processing costs have been high.

Furthermore, in the process of press-forming the core cord, the core cord is simultaneously press formed over the whole of its upper surface and the whole of its side faces in the longitudinal direction thereof by means of an ultrasonice wave horn and a press means so as to impart the predetermined height and width. However, by press forming over the whole of the upper surface and the whole of the side faces of the cord, it is in fact difficult to obtain the predetermined height and width of the core cord.

SUMMARY OF THE INVENTION

Therefore, it is an object of the present invention to provide a space portion processing method and apparatus for a slide fastener chain which improve processing efficiency and lower processing costs.

Another object of the present invention is to provide a space portion processing method and apparatus for a slide fastener chain which enables the above mentioned preprocessing of the space portion of the slide fastener chain to be carried out in one continuous process.

Still another object of the present invention is to provide a space portion processing apparatus for a slide fastener chain which is simple and small in size.

These and other objects have been attained in a space portion processing method of a slide fastener chain as a preprocessing before attaching parts forming a separable end stop such as a retainer pin and a separable pin at the space portion of a slide fastener chain formed by cutting and removing a row of elements for a certain length from a row of coil-like continuous fastener elements of thermoplastic resin attached around a core cord along each of the facing side edges of a pair of fastener tapes, by simultaneously carrying out fusion of the element cut edges at the end of said space portion into said tapes and press-forming of said core cords by using the same pressing means after said space portion is detected and positioned and said slide fastener chain is held on a bed.

The step of simultaneously carrying out the fusion of the cut element edges and press-forming the core cord involves press-forming the side faces of first portions of the core cord by means of a pair of right and left side jaws provided such as to be moveable toward the core cord from both sides of the space portion, said first portions of the core cord thereby being forced to swell upwardly, and, at the same time, pressing the space portion from the upper side by means of an ultrasonic wave horn having first pressing surfaces from pressing the element cut edges at the end of the space portion, second pressing surfaces from pressing the upper surface of the first portions of the core cord and third pressing surfaces for pressing the side faces of second portions excluding the first portions of the core cord, whereby the element cut edges are fused into the tapes, the upwardly swelled first portions are deformed such as to assume predetermined heights and the second portions are deformed such as to assume predetermined widths.

Further, these and other objects have been attained in an apparatus which performs the above mentioned method, namely;

a space portion processing apparatus for a slide fastener chain for preprocessing before attaching parts forming a separable end stop such as a retainer pin and a separable pin at the space portion of a slide fastener chain formed by cutting and removing a row of elements for a certain length from a row of coil-like continuous fastener elements of thermoplastic resin attached around a core cord along each of the facing side edges of a pair of fastener tapes, comprising:

a chain transferring means for moving said slide fastener chain formed with said space portion along a bed;

a space portion detecting means for detecting said space portion of said slide fastener chain and for stopping said chain transferring means;

a positioning stopper which projects into said space portion from the top surface of said bed for preventing the movement of said slide fastener chain;

a chain pulling means positioned on the downstream side of the flow of said slide fastener chain with respect to said positioning stopper for gripping and pulling with predetermined pulling force said slide fastener chain toward said downstream side;

a tape holding means positioned on the upstream side of the flow of said slide fastener chain with respect to said space portion for pressing said fastener tape portions of said slide fastener chain on said bed;

a pair of right and left side jaws provided such as to be movable toward said core cord from both sides of said space portion so as to press-form the side faces of said core cord at said space portion; and an ultrasonic wave horn having first pressing surfaces for pressing the cut element edges at the end of said space portion and second pressing surfaces for pressing the upper surface of said core cord, said horn being provided such as to be movable in a downward direction toward said space portion.

Since the present invention is constructed as described above, the space portion processing method and apparatus for a slide fastener chain according to the present invention brings about the following effects:

a processing apparatus can be made simple and small in size, and processing efficiency can be improved, thus lowering processing costs, because, as described above, fusion of the cut element edges at the end of the space portion into the tapes and press-forming of the core cords are carried out simultaneously in one continuous process by using the same pressing means. Futhermore, the core cords are press-formed so as to assume an accurately predetermined height and width, and the attachment of parts forming a separable end stop is thus firmly fixed to the pair of fastener tapes.

The above and other objects and attendant advantages of the present invention will be more readily apparent to those skilled in the art from a reading of the following detailed description in conjunction with the accompanying drawings which show one preferred embodiment of the invention for illustration purposes only, but not for limiting the scope of same in any way.

DETAILED DESCRIPTION OF THE PREFERRED EMBODIMENT

Figure 1:
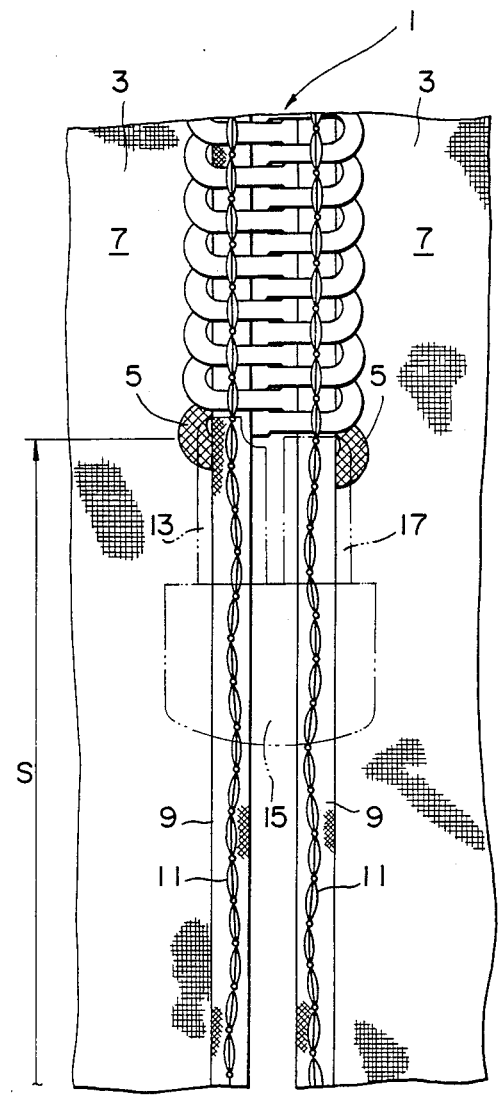
FIG. 1 is a plan view of a semi-finished slide fastener chain with a separable end stop consisting of a fixed retainer, a retainer pin and a separable pin.
Figure 2:
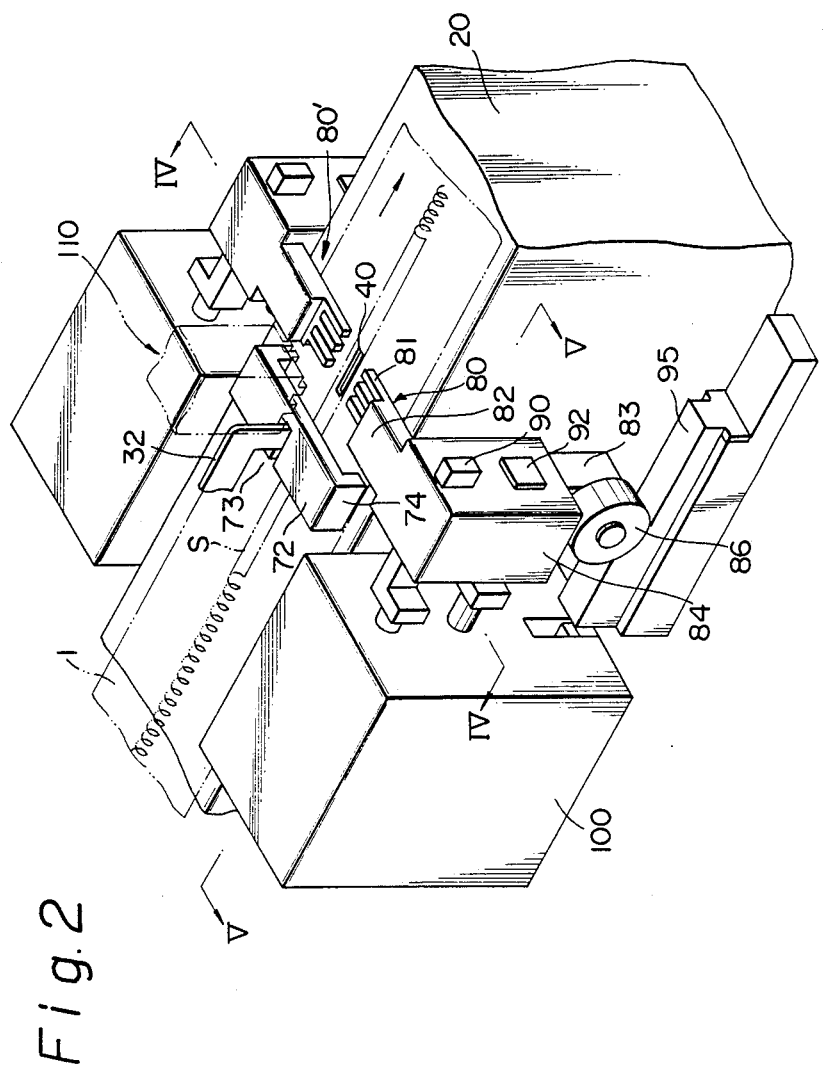
FIG. 2 is a perspective view of a major portion of the apparatus as one embodiment of the present invention.
Figure 3:
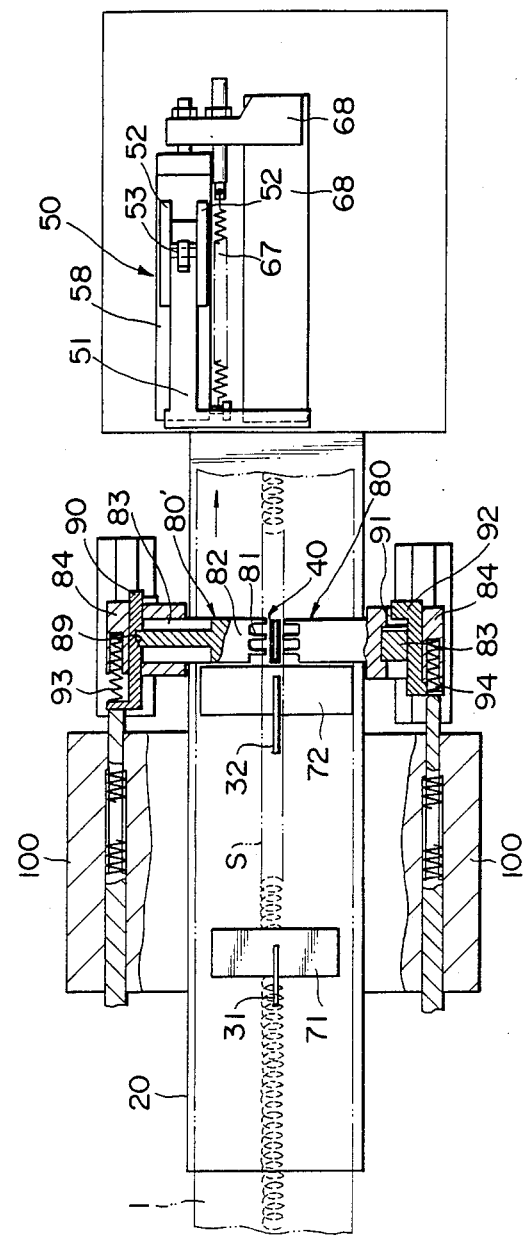
FIG. 3 is a plan view showing the whole apparatus of the same embodiment, a portion of which is shown in section.

FIGS. 2 and 3 are a perspective view of the major portion of the apparatus showing one embodiment of the present invention and a plan view of the whole part thereof, respectively.

The apparatus according to this embodiment comprises the following parts. Namely, a chain transferring means (not shown) for continuously moving the slide fastener chain 1 formed with a space portion "S" along an upper surface of the bed 20; a space portion detecting means comprising a first sensing member 31 and a second sensing member 32 which are disposed in mutually spaced apart relation along the chain flow path on the bed 20 so as to detect the beginning of the space portion "S" for slowing down the chain transferring means and to detect the end of the space portion "S" for stopping the chain transferring means, respectively; a positioning stopper 40 which is provided adjacent to the second sensing member 32 on the downstream side of the chain flow and which projects into the space portion "S" of the chain so as to prevent the movement of the chain; a chain pulling means 50 positioned on the downstream side of the chain flow with respect to the positioning stopper 40 for gripping and pulling the chain 1 with predetermined pulling force toward the downstream side; a first and a second tape holding members 71, 72 for pushing the tape portions of the chain 1 onto the bed, the tape holding members being positioned on the upstream side with respect to the positioning stopper 40 which positions the chain space portion "S"; a pair of right and left side jaws 80, 80' provided such as to be movable toward the positioning stopper 40 from both sides of the chain space portion "S" as positioned by the positioning stopper 40; and an ultrasonic wave horn 110 provided such as to be movable in a downward direction toward the positioning stopper 40 which positions the chain space portion "S".

The first and second sensing members 31, 32 can be constructed, for example, by shifting switch which is movable between a position in which it rides on the element of the chain 1 and a position in which it is lowered into the space "S" of the chain by virtue of being constantly spring-loaded in the downward direction. The sensing members can be constructed in a different way by using photoelectric tubes which send and receive light signals through the chain space portion so as to detect the beginning and the end of the space portion.

Figure 4:
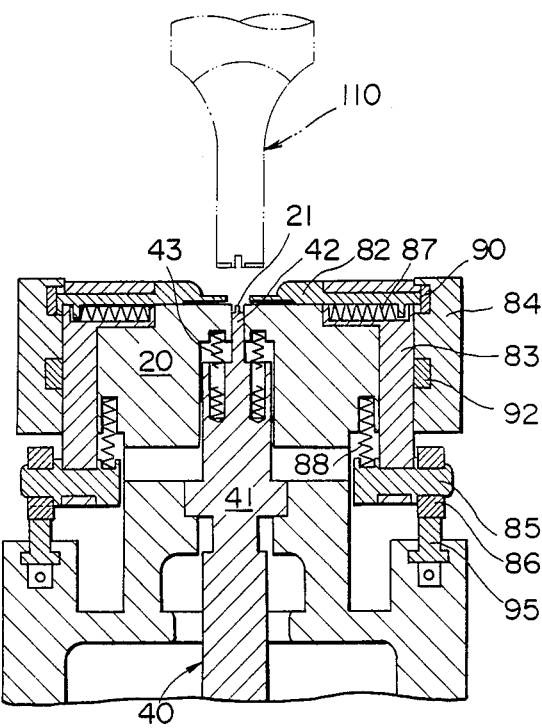
FIG. 4 is a sectional view along the line IV—IV of FIG. 2.

The positioning stopper 40 is, as shown in FIG. 4, supported so that the main body 41 can be moved vertically inside the bed 20. The top portion 42 which projects into the space portion "S" can be pushed out through an upper opening 21. The stopper 40 is, however, normally kept at a lower retracted position by a spring 43 so that the top portion 42 is normally kept at a retracted position below the upper face of the bed 20.

The top portion of the positioning stopper is positioned in such a way that it can project into the space portion at a position adjacent to and on the downstream side of the space end position of the chain 1 which is detected by the second sensing member 32. At the top of the positioning stopper, as will be explained later, a projection which is received in a groove on the bottom face of the ultrasonic wave horn is provided.

Figure 6:
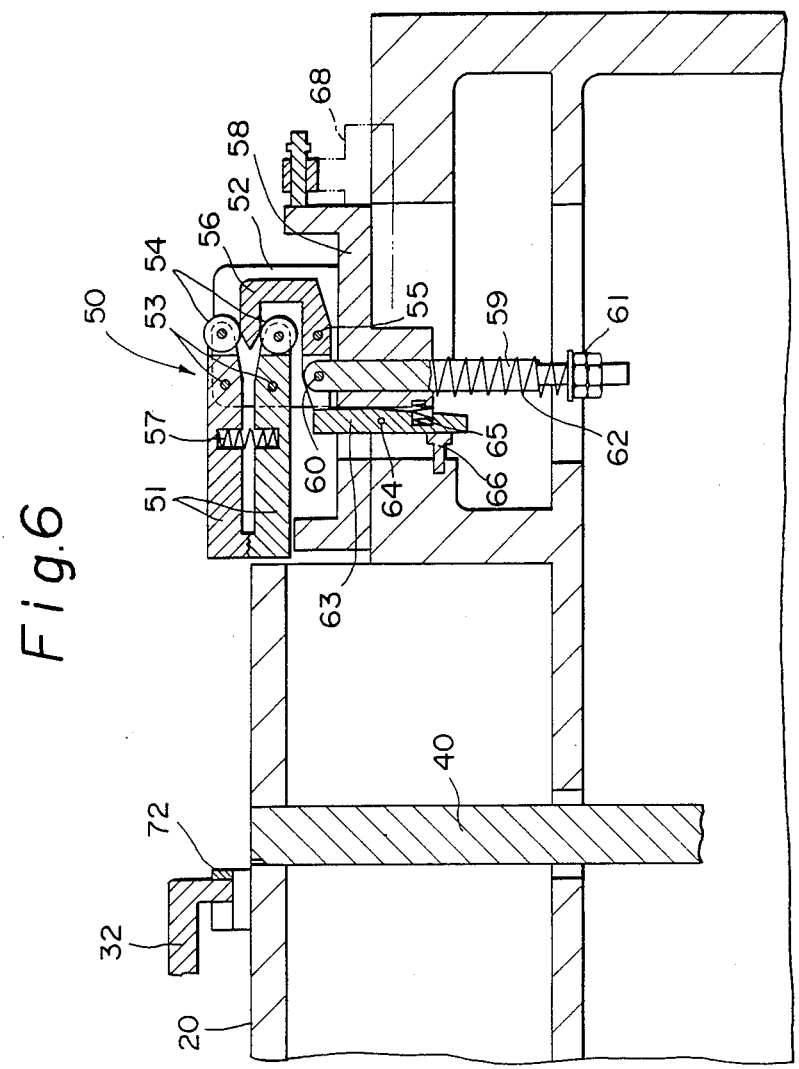
FIG. 6 is a sectional view showing the mechanism of a chain pulling means.

The chain pulling means 50 has, as shown in FIG. 3 and FIG. 6, a pair of upper and lower jaws 51, 51 which project into the chain flow path along the bed 20. Each jaw 51 is pivoted in its middle portion on a vertical support plate 52 at the position 53 and supports a roller 54 rotatably at its rear end. Between two rollers 54, 54, the leading end of a cam 56 which is pivoted in its middle portion 55 on a support plate 52 comes in so as to close the jaws 51, 51 against the force of a spring 57. The rear end of the cam 56 is pivoted at the position 60 to an upper end of an actuation bar 59 which is provided vertically slidably in an interlocking plate 58, the interlocking plate being formed integrally with the support plate 52. The actuation bar 59 is forced downward by a spring 62 installed therearound between a nut 61 on the bar and the interlocking plate 58 so that the leading end of the cam 56 is constantly forced to come into a position between the rollers 54, 54. A nail bar 63 is pivoted in its middle portion to the interlocking plate 58 at the position 64, and is constantly urged in a clockwise direction by a spring 65 provided between the nail bar and the interlocking plate 58. When the rear end of the cam 56 is pushed up by the actuation bar 59 with the bottom end of the nail bar 63 being disengaged from a contact block 66 provided on the bed 20, the upper end of the nail bar 63 moves to a position under the rear end of the cam 56 so as to prevent the downward movement of the actuation bar 59. The interlocking plate 58 is connected with an actuation plate 68 by means of a tension spring 67. If the actuation plate 68 is moved toward the downstream side of the chain flow from the position shown in FIG. 6, the interlocking plate 58 is also moved in the same direction by means of the spring 67. Thus, the chain 1 is pulled to the right with a predetermined force while being clamped between both jaws 51, 51. When the actuation plate 68 and the interlocking plate 58 have been moved to the right for a certain distance from the position shown in FIG. 6, the actuation bar 59 is pushed up by a cam means (not shown) and the leading end of the cam 56 is pulled out from a position between the rollers 54, 54, causing the jaws to open relative to each other. Thus the gripping force that has been applied to the chain is released. At this moment, the upper end of the nail bar 63 is moved to a position under the rear end of the cam 56 by the force of spring 65, where the nail bar 63 is locked by its contact with the lower face of the rear end of the cam 56, which prevents the downward movement of the actuation bar 59.

The actuation plate 68 and the interlocking plate 58 are then returned to the position shown in FIG. 6 with the jaws 51, 51 kept open, whereupon the bottom end of the nail bar 63 is hit by the contact block 66 and the nail bar is turned in a counterclockwise direction, disengaging the upper end of the nail bar 63 from the rear end of the cam 56. By this movement of the nail bar 63, the actuation bar 59 is allowed to move downwardly causing the leading end of the cam 56 to move into a position between the rollers 54, 54. Thus the jaws 51, 51 are closed again. By repeating the above mentioned steps, the chain 1 can be pulled repeatedly with a predetermined force in the downstream direction of the travel of the chain.

The first and second tape holding members 71, 72 are disposed at the positions of the first and second sensing members 31, 32. Each of the tape holding members has a groove 73 at its center (FIG. 2) to allow the vertical movement of the sensing member, and legs 74 on both sides to press-hold the tape upper surface across the rows of elements of the chain. The tape holding members are resiliently pushed on the tape upper surface.

Figure 5:
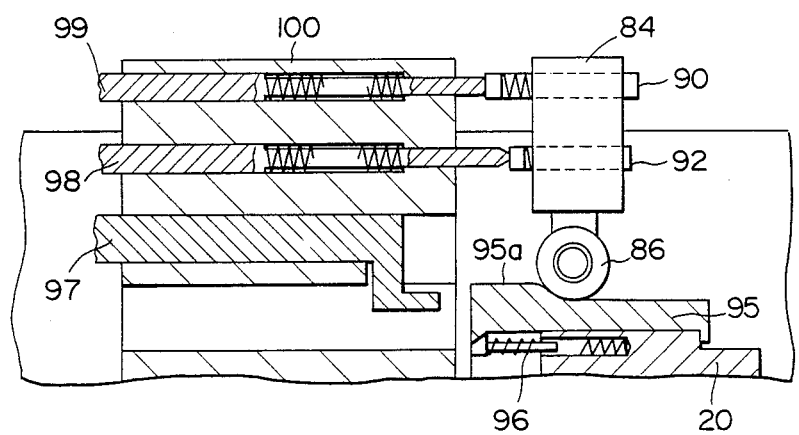
FIG. 5 is a sectional view along the line V—V of FIG. 2.

The pair of side jaws 80, 80' are positioned symmetrically right and left of the bed center line so as to uniformly press-form both side faces of the core cord at the chain space portion "S" which has been positioned by the positioning stopper 40. Each side jaw comprises, as shown in FIGS. 2, 3 and 4, a pressing member 82 having a plurality of pressing bars 81 at its leading end, a support member 83 which supports the pressing member in a laterally slidable manner relative to the bed, and a support block 84 which supports the support member in a vertically slidable manner relative to the bed. At the bottom of the support member 83, a roller 86 is attached rotatably by means of a shaft 85. The pressing member 82 is forced by a spring 87 provided between the pressing member 82 and the support members 83 so that the pressing bars at the leading end thereof are constantly kept in a retracted position, and the supporting member 83 is constantly forced downward by a spring 88 provided between the bed 20 and the roller shaft 85. In the support block 84, a plate cam 90 having a tapered surface 89 which engages with the sloping surface of the pressing member at the outer end thereof and a stopper 92 which is engageable with a notch 91 provided on one side of the support member 83 are provided such as to be slidable in the longitudinal direction of the bed, as shown in FIG. 3 and FIG. 4. The plate cam 90 is constantly urged by a spring 93 provided between the plate cam and the support block 84 in such a direction as to allow backing up of the pressing member 82. The stopper 92 is constantly urged by a spring 94 provided between the stopper and the support block 84 in such a direction as to permit its engagement with a notch 91 on the support member 83. Further, a sliding plate 95 contacting the roller 86 is attached to the bed 20 in such a manner as to be slidable in the longitudinal direction thereof, as shown in FIGS. 2, 4 and 5. The sliding plate 95 has a profile surface 95a on its upper side which determines a raised position and a lowered position of the roller 86. The sliding plate is constantly urged by a spring 96 provided between the sliding plate and the bed 20 in such a direction as to allow the roller 86 to stay at a lowered position. On each side of the bed 20, an actuation bar containing block 100 which slidably supports a first, a second and a third actuation bar 97, 98 and 99 that push the end portion of the slide plate 95, the stopper 92 and the plate cam, respectively. Although the actuation bars are constantly urged toward their retracted positions by springs, they can be individually moved against the force of the spring by means of a driving means such as a solenoid actuation means. If the first actuation bar 97 is operated, the slide plate 95 is moved to the right in FIG. 5, and the roller 86 is raised. Then the notch 91 on the support member 83 engages with the stopper 92, and the pressing member 82 is held at a raised position apart from the upper surface of the bed 20. The sliding plate 95 is returned to a position shown in FIG. 5 by the force of the spring 96. Under this condition, the chain space portion "S" is positioned by the positioning stopper 40. If the second actuation bar 98 is operated, the stopper 92 is disengaged from the notch 91 on the support member 83, and the support member 83 is lowered by the force of spring 88. Thus the pressing member 82 is press-contacted on the tape surface of the chain 1. Further, if the third actuation bar 99 is operated, the plate cam 90 pushes the pressing member 82 against the force of the spring 87 toward the positioning stopper 40 so as to press-form the sides of the core cords at the space portion "S" by means of the pressing bars 81 at the leading end thereof.

Figure 7:
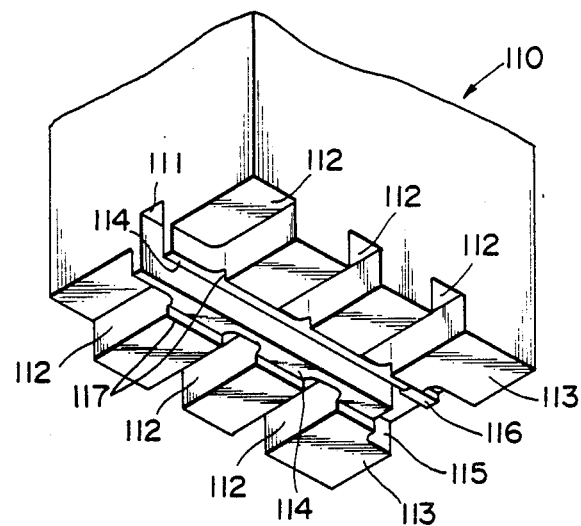
FIG. 7 is a partial perspective view showing the bottom face of an ultrasonic wave horn.

The ultrasonic wave horn 110 has on its bottom surface, as shown in FIG. 7, a first groove 111 for receiving the top portion of the positioning stopper 40, a second plurality of grooves 112 for receiving each pressing bar 81 at the leading end of each side jaw 80, 80', first pressing surfaces 113 for pressing element cut edges (5 in FIG. 8) at the end of the chain space portion "S" that is positioned by a second pressing surface 114 having a groove-like configuration for pressing the upper surface of first portions of the core cord at the space portion, and a third vertical pressing surface 117 for pressing the side faces of second portions excluding the first portions of the core cord at the space portion. At the upstream end of the ultrasonic wave horn bottom face relative to the direction of travel of the chain, cut grooves 115 are provided for receiving the end portions of the elements (2 in FIG. 8) adjacent to the space portion as well as an element holder 116 for holding the end portions of the elements with a small pressing force which allows them to keep their original shape during the press-forming operation of the ultrasonic wave horn.

The operation of the above mentioned apparatus will be described hereinbelow.

Figure 8:
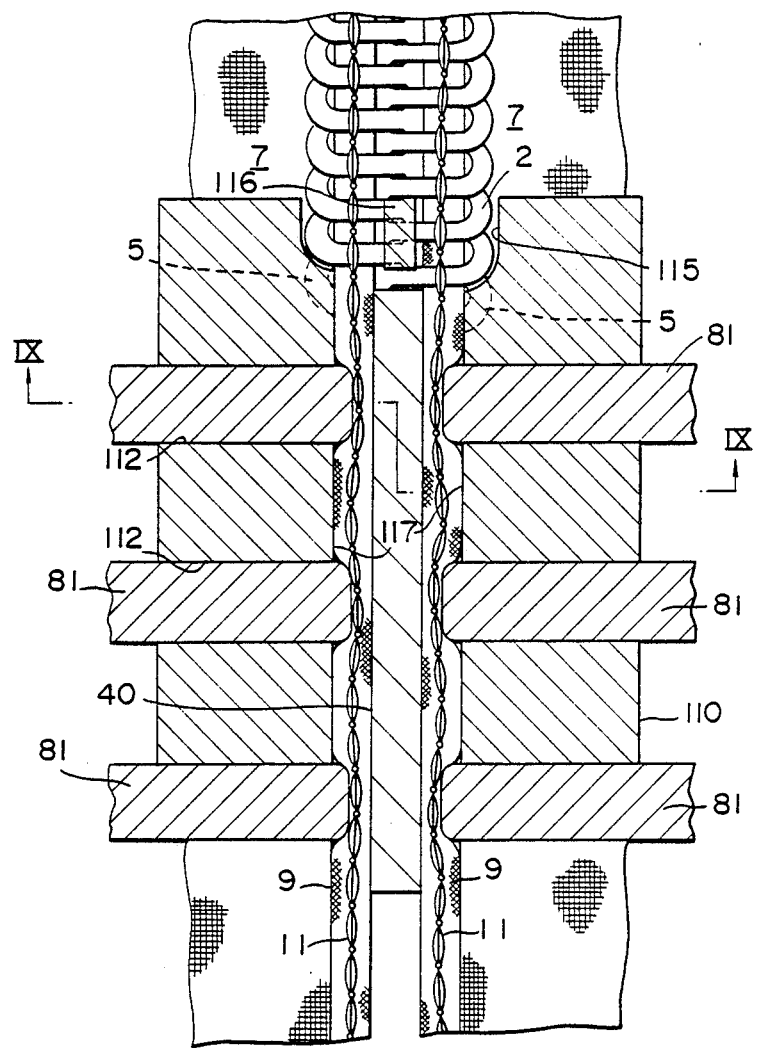
FIG. 8 is a sectional view showing the relation between the slide fastener chain, a pair of right and left side jaws and the ultrasonic wave horn.

The slide fastener chain 1 which has been formed with a space portion "S" in the previous step is continuously moved along the upper surface of the bed 20 in the direction shown by the arrows in FIG. 2 and FIG. 3. When the first sensing member 31 detects the starting point of the space portion "S" of the chain 1, the chain transferring means is decelerated on receiving the detected signal. When the second sensing member 32 detects the end point of the space portion "S", in other words, when the second sensing member rides on the elements adjacent to the space end point, the chain transferring means is stopped. When the second sensing member emits a signal on detecting the end point of the space portion "S", the positioning stopper 40 is pushed against the force of spring 43 (FIG. 4) and is projected into the space portion "S" adjacent to the element portion. Then, after the actuation plate 68 of the chain pulling means is moved to the position shown in FIG. 6 and the chain 1 is grip-held by a pair of jaws 51, 51, the actuation plate 68 is moved in the downstream direction of the travel of the chain, applying a predetermined tension to the chain 1. The tensional force is such that it does not break the elements of the chain 1 at the point where they engage with the positioning stopper 40. In this way, the end point of the space portion "S" of the chain 1 engaged with the positioning stopper 40 is set at a constant position. Then first and second tape holding members 71, 72 are moved in such a way that the chain tape portions are resiliently pushed onto the upper face of the bed at the upstream side of the space portion so that movement of the chain is prevented during the processing. After the movement of the tape holding members 71, 72, the second actuation bar 98 for operating each side jaw 80, 80' is moved. Namely, the stopper 92 is disengaged from the support member 83, and each pressing member 82 is lowered toward the tape upper face at the space portion "S". Further, the third actuation bar 99 is moved so that each pressing member 82 is pushed toward the positioning stopper 40 by the function of the plate cam 90. By the above steps, each core cord 9 and the sewing threads 11 at the space portion "S" (FIG. 8) are press-formed from the side between the positioning stopper 40 and the pressing bars 81 at the leading end of the pressing members 82 which are aligned with the positioning stopper. Thereby, first portions of each core cord are forced to swell upwardly as shown in the left hand portion of FIG. 9. Then the ultrasonic wave horn 110 is moved downwardly with the side jaws being kept at the above mentioned pushed ahead positions. The ultrasonic wave horn is constructed such that a pressing by ultrasonic vibration is made possible by means of electrical vibration generation means (not shown). By the above mentioned steps, the ultrasonic wave horn presses and fuses each cut element edge 5 into tape face 7 by the first pressing faces 113 (FIG. 7) while the end portions 2 of the elements adjacent to the space portion "S" are being held with a small pressing force without causing deformation of their original configuration by an element holding portion 116 which is provided on the ultrasonic wave horn at a position a certain distance behind the first pressing face 113, as shown in FIGS. 7 and 8.

Figure 9:
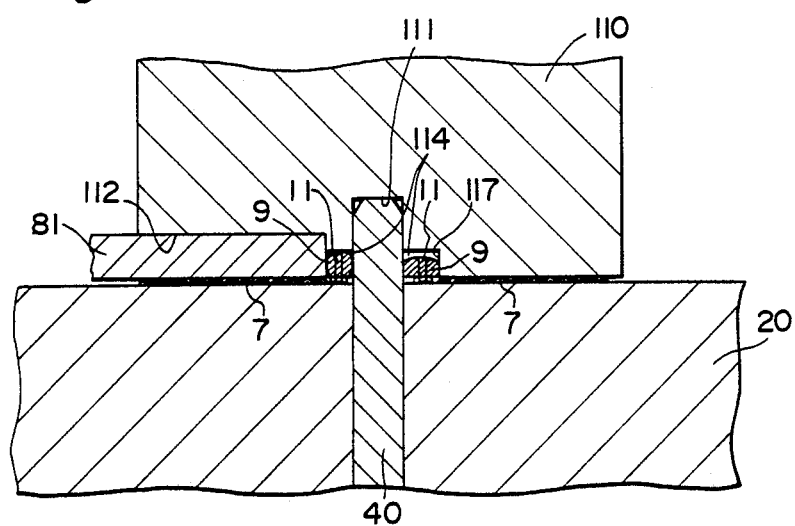
FIG. 9 is a sectional view along the line IX—IX of FIG. 8.

At the same time, the second pressing surfaces 114 (FIGS. 7 and 9) press form the upper surfaces of the upwardly swelled first poritons of each core cord 9 so that they assume predetermined heights as shown in the left hand portion of FIG. 9, together with the sewing threads 11 at the space portion "S". Simultaneously, the vertical thread pressing surfaces 117 (FIGS. 7 to 9) press form the side faces of the second portions of each core cord 9 so that they assume predetermined widths as shown in the right hand poriton of FIG. 9. During the above mentioned pressing step, the upper edge of the positioning stopper 40 and pressing bars 81 of each side jaw 80, 80' are received in the first groove 111 and the second grooves 112 of the ultrasonic wave horn 110, respectively, as shown in FIG. 8 and FIG. 9.

In order to return the above apparatus to its initial condition, the above mentioned steps should be followed in reverse sequence.

Figure 10:
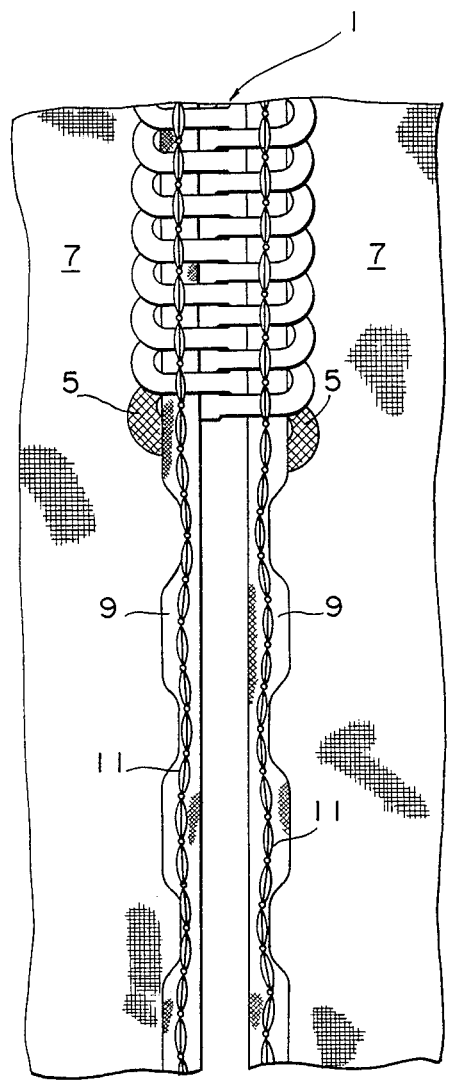
FIG. 10 is a plan view showing the semi-finished slide fastener chain processed according to the method of the present invention.

By repeating the above mentioned series of steps, it is possible to finish the processing sequence shown in FIG. 10 one after another with respect to each space portion of the continuous fastener chain. On the core cord at the chain space portion press-formed as mentioned above, the parts forming a separable end stop such as a retainer pin and a separable pin can be attached by a conventional procedure.

However, in this case, as each core cord 9 is press-formed and thereby assumes an accurately predetermined height and width as mentioned above, the above parts are more firmly fixed to the fastener tapes compared with the conventional case.

I claim:

1. A space portion processing method for a slide fastener chain as a preprocessing before attaching parts forming a separable end stop such as a retainer pin and a separable pin a the space poriton of slide fastener chain formed by cutting and removing a row of elements for a certain length from a row of coil-like continuous fastener elements of thermoplastic resin attached around a core cord along each of the facing side edges of a pair of fastener tapes, characterized in that after said space portion is detected and positioned and said slide fastener chain is held on a bed, fusion of the element cut edges at the end of said space portion into said tapes and press-forming of said core cords are carried out simultaneously by using the same pressing means;

said step of simultaneously carring out the fusion of the cut element edges and press-forming said core cord comprising press-forming the side faces of first portions of said core cord by means of a pair of right and left side jaws provided such as to be movable toward said core cord from both sides of said space portion, said first portion of the core cord thereby being forced to swell upwardly, and at the same time, pressing said space portion from the upper side by means of an ultrasonic wave horn having first pressing surfaces for pressing the element cut edges at the end of said space portion, second pressing surfaces for pressing the upper surface of said first portions of core cord and third pressing surfaces for pressing the side faces of second portions excluding said first portions of the core cord, whereby said element cut edges are fused into said tapes, said upwardly swelled first portions are deformed such as to assume predetermined heights and said second portions are deformed such as to assume predetermined widths.

2. A space portion processing method for a slide fastener chain according to claim 1, wherein the step of detecting space portion comprises detecting the beginning of said space portion and slowing down chain transferring means by means of a first detecting member, and detecting the end of said space portion and stopping said chain transferring means by means of a second detecting member.

3. A space portion processing method for a slide fastener chain according to claim 1, wherein the step of positioning said space portion comprises preventing the movement of said slide fastener chain by means of a positioning stopper which projects into said space portion from the top surface of said bed, and gripping and pulling with predetermined pulling force said slide fastener chain in the downstream direction of the travel of said slide fastener chain by means of a chain pulling means positioned on the downstream side with respect to said positioning stopper.

4. A space portion processing method for a slide fastener chain according to claim 1, wherein the step of holding said slide fastener chain comprises pushing said fastener tape portions of said slide fastener chain onto said bed by means of a tape holding means positioned on the upstream side of said space portion in terms of the direction of travel of said slide fastener chain.

5. A space portion processing apparatus for preprocessing a slide fastener chain before attaching parts forming a separable end stop such as a retainer pin and a separable pin at the space portion of a slide fastener chain formed by cutting and removing a row of elements for a certain length from a row of coil-like continuous fastener elements of thermoplastic resin attached around a core cord along each of the facing side edges of a pair of fastener tapes, comprising:

a chain transfering means for moving said slide fastener chain formed with said space portion along a bed;

a space portion detecting means for detecting said space portion of said slide fastener chain and for stopping said chain transferring means;

a positioning stopper which projects into said space portion from the top surface of said bed for preventing the movement of said slide fastener chain;

a chain pulling means positioned on the downstream side of said positioning stopper in terms of the direction of travel of said slide fastener chain and adapted to grip and pull with predetermined pulling force said slide fastener chain in the downstream direction;

a tape holding means positioned on the upstream side of said space portion in terms of the direction of travel of said slide fastener chain and adapted to push said fastener tape portions of said slide fastener chain onto said bed;

a pair of right and left side jaws provided such as to be movable toward said core cord from both sides of said space portion so as to press-form the side faces of first portions of said core cord at said space portion, said first portions being thereby forced to swell upwardly; and an ultrasonic wave horn having first pressing surfaces for pressing the element cut edges at the end of said space portion, second pressing surfaces for pressing the upper surface of said first portions of the core cords, and third pressing surfaces for pressing the side faces of second portions excluding said first portions of the core cord, said horn being provided such as to be movable downward toward said space poriton, whereby said element cut edges are fused into said tapes, said upwardly swelled first portions are deformed such as to assume predetermined heights and said second portions are deformed such as to assume predetermined widths.

6. A space portion processing apparatus for a slide fastener chain according to claim 5, wherein said space portion detecting means comprises a first sensing member which detects the beginning of said space portion and slows down said chain transferring means, and a second sensing member which detects the end of said space portion and stops said chain transferring means.

7. A space portion processing apparatus for a slide fastener chain according to claim 5, wherein said tape holding means comprises first and second tape holding members positioned apart in the direction of travel of said slide fastener chain.

8. A space portion processing apparatus of a slide fastener chain according to claim 5, wherein each of said pair of right and left side jaws has a plurality of pressing bars at the leading end thereof.

9. A space portion processing apparatus of a slide fastener chain according to claim 9, wherein said ultrasonic wave horn has a first groove for receiving the top portion of said positioning stopper and a second plurality of grooves for receiving said plurality of pressing bars of each of said pair of right and left side jaws on its bottom face together with said first and second pressing surfaces.

* * * * *